May 3, 1960  R. H. MILLER  2,935,142
REVERSIBLE DISK PLOW WITH ABUTMENT TO LIMIT LATERAL SWING
Filed April 19, 1956  3 Sheets-Sheet 1

Inventor
Robert H. Miller
Paul O. Pippel
Attorney

May 3, 1960  R. H. MILLER  2,935,142
REVERSIBLE DISK PLOW WITH ABUTMENT TO LIMIT LATERAL SWING
Filed April 19, 1956  3 Sheets-Sheet 2
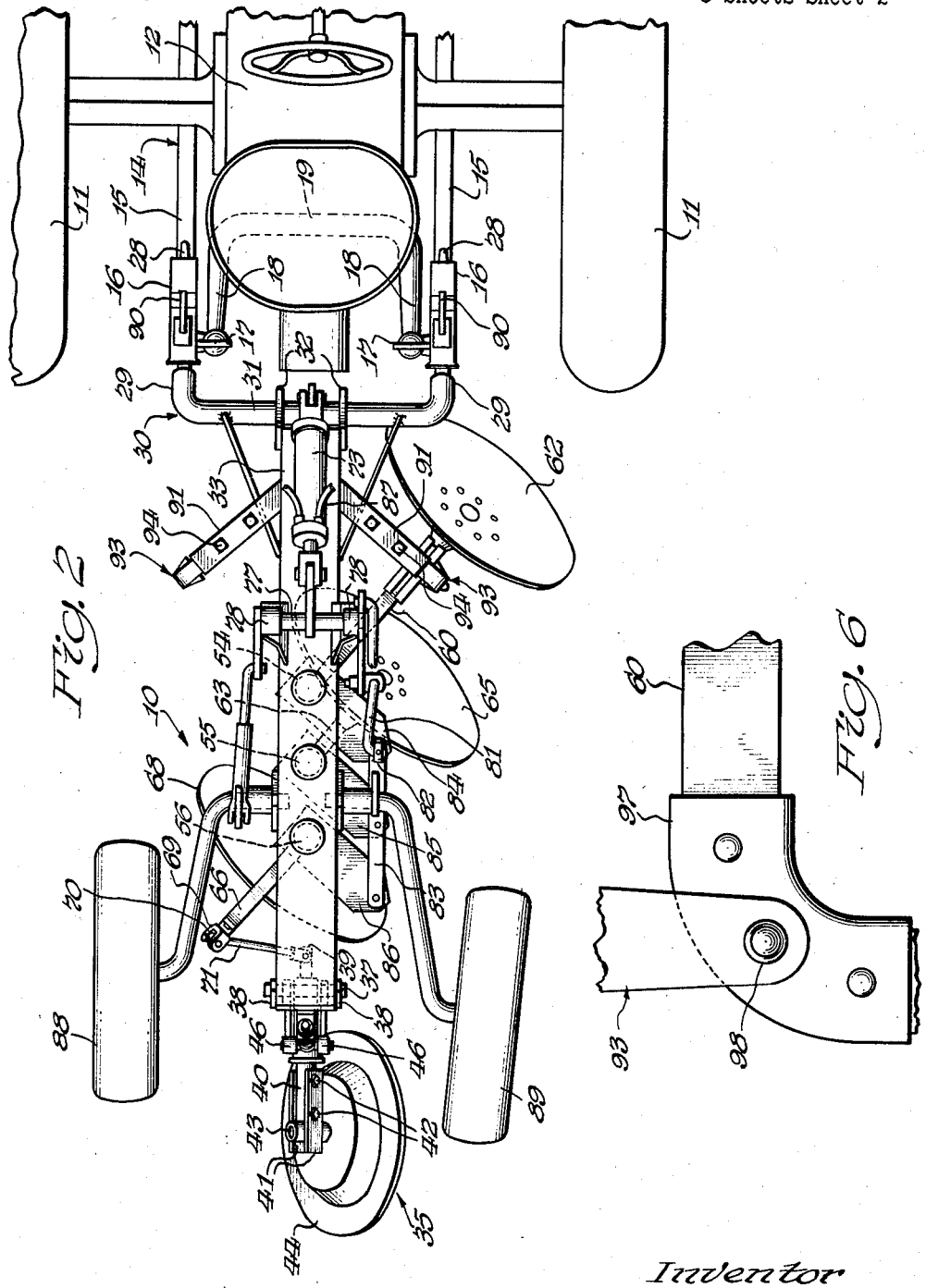
Inventor
Robert H. Miller
Paul O. Pippel
Attorney

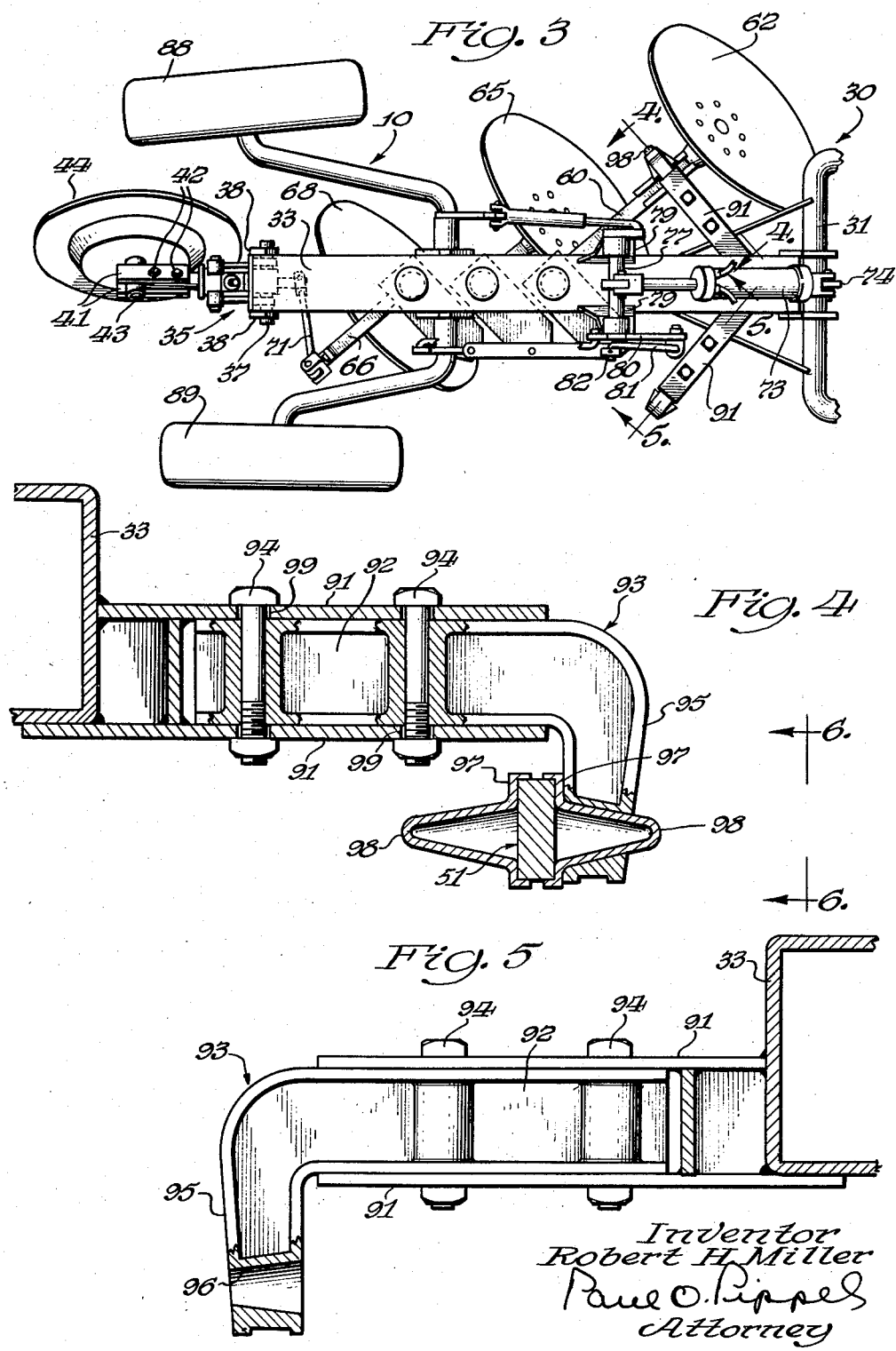

United States Patent Office 2,935,142
Patented May 3, 1960

2,935,142

REVERSIBLE DISK PLOW WITH ABUTMENT TO LIMIT LATERAL SWING

Robert H. Miller, Memphis, Tenn., assignor to International Harvester Company, a corporation of New Jersey Application April 19, 1956, Serial No. 579,268

3 Claims. (Cl. 172—221)

This invention relates to plows and particularly to reversible or two-way disk plows. The invention is particularly concerned with a reversible plow wherein one of the disks is mounted at the end of an elongated lever arm and another disk is mounted on a relatively shorter lever arm for lateral swinging about a vertical axis from one side to the other to dispose the disks in general alignment on opposite diagonals with respect to the direction of travel of the plow for alternate right and left-hand plowing.

An object of the invention is the provision of novel means for limiting the lateral swinging of the lever arms on which the disks are mounted when the earth-working units are swung from one alternate operating position to the other.

Another object of the invention is the provision of means interconnecting the spindles on which the disk-carrying arms are mounted, by which said arms are swung simultaneously to place the disks in alignment on opposite diagonals for right and left-hand operation, and means cooperable with the relatively longer disk-carrying arm at the end of its swinging movement to function not only as limiting means for the arm but as a support therefor as well, to offset vertical stress thereon.

Other objects and advantages of the invention will become clear from the following detailed description when read in conjunction with the accompanying drawings, wherein:

Figure 2 is a plan view of the structure shown in Figure 1 with parts of the implement attaching structure of the tractor removed, and showing the plow disks operating on the right-hand diagonal for right-hand plowing;

Figure 3 is a plan view of the plow structure shown in Figure 2 with the disk gang operating on the left-hand diagonal;

Figure 4 is a section taken on the line 4—4 of Figure 3;

Figure 5 is a section taken on the line 5—5 of Figure 3; and

Figure 6 is a detail viewed in elevation on the line 6—6 of Figure 4.

Figure 1:
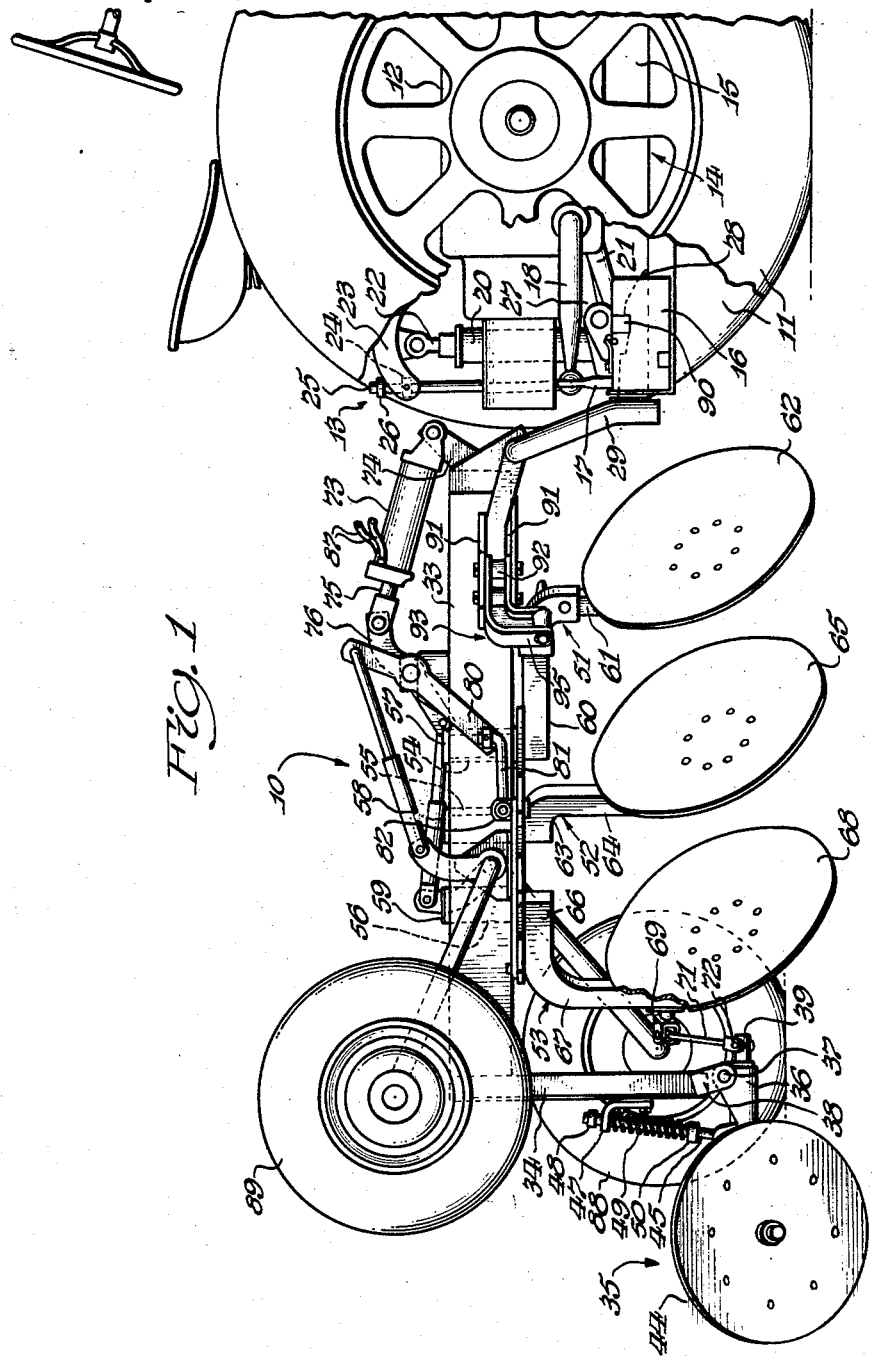
Figure 1 is a view in side elevation showing the rear end of a tractor, with parts removed for clarity, having mounted thereon a reversible disk plow embodying the features of this invention.

Referring to the drawings, the implement embodying this invention is illustrated as a three-bottom reversible disk plow generally designated by the numeral 10 and is adapted to be directly connected to a tractor having laterally spaced rear drive wheels 11 and a longitudinally extending body 12. The tractor is provided with an implement lifting and attaching structure designated at 13, which forms no part of this invention, but which may be briefly described as comprising a drawbar 14 including laterally spaced rearwardly extending draft bars 15 to the rear ends of which are affixed elongated socket members 16. Laterally spaced lift links 17 are pivotally connected at their lower ends to the sockets 16 and at their upper ends to the ends of rearwardly bent arms 18 provided at the end of the transverse rockshaft 19 mounted on the tractor body.

A hydraulic cylinder 20 is anchored at its lower end to a bracket 21 affixed to the tractor body (see Figure 1), and a piston rod 22 slidable in the cylinder is pivotally connected to a link 23 pivotally mounted on the tractor body. The free end of link 23 has mounted thereon a swivel 24 which slidably receives a lift rod 25 having a collar 26 thereon for engagement with the swivel 24, and the lower end of rod 25 is connected to an arm 27 affixed to rockshaft 19, and shown only in Figure 1. Thus, operation of cylinder 20 to extend the piston rod rocks the arms 18 and lifts drawbar 14.

Sockets 16 slidably receive elongated shafts 28 affixed to and projecting forwardly from the depending arms 29 of an implement hitch structure in the form of a bail 30 having a transverse portion 31 mounted in brackets 32 affixed to the forward end of a longitudinally extending box section 33 forming the main frame of implement 10. Main frame 10 is generally square in section and has affixed to its rear end a vertically downwardly extending upright member 34.

Upright member 34 serves as the support for a rear furrow wheel assembly 35 which includes a sleeve member 36 pivotally mounted at 37 between a pair of lugs 38 affixed to the lower end of upright 34. Sleeve 36 rotatably supports the longtudinally extending shaft 39, the rear end of which is received in another sleeve 40 secured between a pair of straps 41 by bolts 42 which extend through the sleeve 40 and shaft 39. Straps 41 also straddle and are affixed to a stub shaft 43 upon which is mounted a furrow wheel 44 which is adapted to bear against the furrow wall formed by the disk plow and to offset side draft upon the implement.

The furrow wheel 44 is resiliently supported for limited vertical movement by the provision of a rod 45, the lower end of which is mounted between a pair of lugs 46 projecting upwardly from sleeve 36, and the upper end of rod 45 is slidably received in a suitable opening provided in a bracket 47 mounted on upright 34. Downward movement of the wheel 44 is limited by the provision of a collar 48 at the upper end of rod 45, and a coil spring 49 surrounds the rod and abuts a collar 50 at its lower end, and at its upper end engages the bracket 47.

Three tool standards 51, 52 and 53 are mounted upon the main frame 33 by the provision thereon of vertical spindle portions 54, 55 and 56, respectively, rotatably mounted in bearings 57, 58 and 59 mounted in the tool frame 33. To the lower end of the spindle portion 54 of the forwardmost tool standard 51 is affixed an elongated horizontal arm portion 60 which is shown in Figure 2 as extending forwardly and outwardly diagonally of the direction of travel and on the right-hand side of frame 33, and the forward outer end thereof is bent downwardly to provide a vertical tool-carrying portion 61 upon the lower end of which is mounted an earth-penetrating disk 62.

The spindle portions 54, 55 and 56 of the tool standards are arranged in longitudinal alignment on the tool frame 33, and the middle standard 52 includes a short horizontal arm portion 63 and a vertical tool-carrying portion 64 to the lower end of which is attached another earth-penetrating disk 65. As will be observed particularly well in Figures 2 and 3, arm 60 of forwardmost standard 51 is rather long, and arm 63 of middle standard 52 is relatively short. These arms swing from a position projecting forwardly and outwardly on the right-hand diagonal to a position as indicated in Figure 3 on the left-hand diagonal.

The rearmost tool standard 53 swings on a radius which is longer than that of the middle standard 52 and shorter than that of the forwardmost standard 51. Standard 53 includes a horizontal arm portion 66 which, in the position of the parts shown in Figure 2, extends outwardly and rearwardly parallel to the arms 60 and 63 but from the opposite side of the tool frame 33. The rear end of arm 66 is bent downwardly to provide a tool-carrying portion 67 which supports at its lower end a third earth-penetrating disk 68. Standard 67 has pivotally mounted on its lower end a clevis 69 which carries a swivel 70 in which is slidably received a rod 71, the other end of which is bifurcated and secured to shaft 39 by a pin 72. Thus, when tool standard 53 is swung laterally from one operating position to another, motion is transmitted therefrom through rod 71 to rotate shaft 39 and therefore swing furrow wheel 44 bodily from one position to another.

Simultaneously swinging of the gang of disks 62, 65 and 68 from the position of Figure 2 to that of Figure 3 is accomplished by mechanism including a hydraulic cylinder 73 pivotally mounted upon bracket 74 affixed to the transverse portion 31 of the implement hitch 30, and a piston rod 75 slidable in the cylinder is pivotally connected to an arm 76 mounted upon a transverse rockshaft 77 rotatably supported in bearings 78 carried by brackets 79 affixed to and projecting upwardly from tool frame 33. A rock arm 80 affixed to one end of shaft 77 extends downwardly therefrom and is pivotally connected to one end of a link 81, the other end of which is pivotally connected to a swivel 82 mounted on a strap 83 which extends across and is pivotally connected to a plurality of lever arms 84, 85 and 86 affixed to and extending laterally from the lower ends of the respective spindles 54, 55 and 56. Power is thus transmitted from hydraulic cylinder 73 through rockshaft 77 to swing the lever arms 84, 85 and 86 and, therefore, tool standards 51, 52 and 53 from the position of Figure 2 to the position of Figure 3. Fluid under pressure is supplied to cylinder 73 through hose lines 87 from a source of fluid pressure, not shown, on the tractor.

The operating depth of the disks 62, 65 and 68 is gauged in both operating positions of the disk gang by the provision of gauge wheels 88 and 89, the construction and operation of which form no part of this invention, and further description of which may be had by a reference to copending U.S. application, Serial No. 579,270 filed April 19, 1956, now Patent 2,916,097.

As will be clear from the drawings, arm 60 at the end of which forwardmost disk 62 is mounted is rather long, extending forwardly and laterally a considerable distance from spindle 54 and is subject to considerable stress in a vertical direction during operation. It is therefore important to provide a vertical support for this forwardmost tool standard in both of its operating positions. It is also necessary to provide lateral limits for the swinging of the disk gang to provide a uniform width of cut as the implement reverses its direction of operation at each end of the field. When shafts 28 are received in sockets 16 of the tractor implement attaching structure, the parts are held together by the provision of suitable latching means indicated at 90 and an integral association is made between the tractor and implement whereby the implement is lifted when the drawbar 14 is lifted. The disk gang is shifted when the tractor is turned at the end of a field and the implement is lifted to a transport position on the tractor by operation of the cylinder 73. In order to limit the lateral swinging of the disk gang from one alternate position to the other a pair of vertically spaced bars 91 are affixed to each side of the frame 33 near its forward end and extend rearwardly and outwardly therefrom. These bars straddle the horizontal portion 92 of a supporting member 93 and are secured thereto by bolts 94.

The projecting outer end of member 93 is bent downwardly to form an upright portion 95 having at its lower end an inwardly flared opening or socket 96. A pair of curved plates 97 are fitted to the opposite sides of disk standard 51 at the bent outer end thereof, and formed integral with each plate is a laterally projecting conical member 98 adapted to be slidably received in the opening 96.

As will be clear from Figures 2 and 3, duplicate members 91 and 93 are provided on each side of the tool frame 33 and like numerals represent like parts on each. Upon reception of the appropriate member 98 in the opening 96 of one of the members 93, the lateral swinging of the forwardmost tool support 51 to either of its alternate operating positions has been stopped, the operating position for the tools being shown in Figure 2 for right-hand plowing and in Figure 3 for left-hand plowing, and it will also be observed that the member 93 provides vertical support for the forward beam 51 at the outer end thereof. The lateral swinging of the other disks of the gang is limited by virtue of the operating connection made therebetween by link 83 and levers 84, 85 and 86.

Minor adjustments may be made in the position of member 93 with respect to the bars 91 by providing slots such as are indicated at 99 in Figure 4 for the reception of bolts 94 in bars 91.

The operation of the reversible disk plow of this invention should be clearly understood from the foregoing description. It should also be understood that the invention has been described in its preferred embodiment and that modifications may be made therein without departing from the spirit of the invention or the scope of the appended claims.

What is claimed is:

1. For use in a multi-disk two-way disk plow of the type wherein each disk is mounted on a frame by means including a vertical spindle and an arm extending horizontally therefrom and diagonally with respect to the direction of travel and carrying a disk at its outer end and swingable laterally about the axis of the spindle from one diagonal to the other, the combination of means for supporting the outer disk-carrying end of said arm against vertical stress during operation and means limiting the lateral swinging of said arm, comprising an abutment member carried by the frame on each side thereof engageable with the outer end of said arm to limit the lateral swinging thereof, and complementary means on said disk-carrying outer end of said arm cooperable in a vertical plane with said abutment member upon engagement therewith to provide support for said arm against vertical stress only in the operating positions of the disk.

2. The invention set forth in claim 1, wherein said abutment and said complementary means include horizontal socket and pin members cooperable to prevent relative vertical movement between the frame and said arm.

3. The invention set forth in claim 2, wherein the cooperating surfaces of said socket and pin members are conical to limit the horizontal swinging of the arm and simultaneously provide protection for the arm against vertical stress.

References Cited in the file of this patent

UNITED STATES PATENTS

| 869,672 | Weeks | Oct. 29, 1907 |
|---|---|---|
| 1,090,760 | Stanbery | Mar. 17, 1914 |
| 2,561,032 | Onfrey | July 17, 1951 |
| 2,578,942 | Onfrey | Dec. 18, 1951 |
| 2,764,076 | Fowler | Sept. 25, 1956 |

FOREIGN PATENTS

| 1,086,419 | France | Aug. 11, 1954 |